(12) United States Patent
Sheikman et al.

(10) Patent No.: US 8,742,319 B2
(45) Date of Patent: Jun. 3, 2014

(54) SENSOR AND INSPECTION SYSTEM DEPLOYING AN OPTICAL CONDUIT

(75) Inventors: Boris Leonid Sheikman, Minden, NV (US); Nathan Andrew Weller, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 223 days.

(21) Appl. No.: 13/324,795

(22) Filed: Dec. 13, 2011

(65) Prior Publication Data

US 2013/0146753 A1   Jun. 13, 2013

(51) Int. Cl.
*G01J 1/04* (2006.01)

(52) U.S. Cl.
USPC ..................................... 250/221; 250/227.11

(58) Field of Classification Search
USPC ............ 250/221, 227.11; 340/686.1; 356/502
See application file for complete search history.

(56) References Cited

U.S. PATENT DOCUMENTS

| | | |
|---|---|---|
| 3,927,369 A | 12/1975 | Billeter et al. |
| 4,045,727 A | 8/1977 | Yu et al. |
| 4,313,118 A | 1/1982 | Calvin |
| 4,346,383 A | 8/1982 | Woolcock et al. |
| 4,384,819 A | 5/1983 | Baker |
| 4,652,864 A | 3/1987 | Calvin |
| 4,845,422 A | 7/1989 | Damon |
| 4,862,061 A | 8/1989 | Damon |
| 5,097,227 A | 3/1992 | Yuan et al. |
| 5,227,667 A | 7/1993 | Takinami et al. |
| 5,334,969 A | 8/1994 | Abe et al. |
| 5,459,397 A | 10/1995 | Spillman, Jr. |
| 5,459,405 A | 10/1995 | Wolff et al. |
| 5,506,515 A | 4/1996 | Godshalk et al. |
| 5,670,886 A | 9/1997 | Wolff et al. |
| 5,748,002 A | 5/1998 | Scott et al. |
| 5,801,530 A | 9/1998 | Crosby et al. |
| 5,818,242 A | 10/1998 | Grzybowski et al. |
| 5,854,994 A | 12/1998 | Canada et al. |
| 5,963,034 A | 10/1999 | Mahapatra et al. |
| 5,992,237 A | 11/1999 | McCarty et al. |
| 6,043,774 A | 3/2000 | Singh et al. |
| 6,118,287 A | 9/2000 | Boll et al. |
| 6,227,703 B1 | 5/2001 | DiMatteo et al. |
| 6,261,247 B1 | 7/2001 | Ishikawa et al. |
| 6,320,550 B1 | 11/2001 | Van Voorhies |
| 6,407,540 B1 | 6/2002 | Shepherd |

(Continued)

FOREIGN PATENT DOCUMENTS

WO   9119189 A1   12/1991

OTHER PUBLICATIONS

Search Report and Written Opinion from EP Application No. 12196657.6 dated Apr. 5, 2013.

*Primary Examiner* — Tony Ko
(74) *Attorney, Agent, or Firm* — Hiscock & Barclay LLP

(57) ABSTRACT

Embodiments of an inspection system comprise a conduit that can transmit light between a sensor and a processing component. In one embodiment, the sensor comprises an element that generates an electromagnetic field in response to an input from the processing component. The input comprises a light signal that traverses the conduit to the sensor. The sensor converts the light signal to an electrical signal to operate the element. In one example, the sensor generates a plurality of light signals, which also traverse the conduit to the diagnostic component where the lights signals are processed to determine, in one example, proximity of an object to the sensor.

20 Claims, 2 Drawing Sheets

(56) References Cited

U.S. PATENT DOCUMENTS

| | | |
|---|---|---|
| 6,407,562 B1 | 6/2002 | Whiteman |
| 6,437,751 B1 | 8/2002 | Craven et al. |
| 6,445,995 B1 | 9/2002 | Mollmann |
| 6,462,561 B1 | 10/2002 | Bigelow et al. |
| 6,620,057 B1 | 9/2003 | Pirritano et al. |
| 6,750,621 B2 | 6/2004 | Gandrud |
| 6,778,132 B2 | 8/2004 | Palata |
| 6,864,796 B2 | 3/2005 | Lehrman et al. |
| 6,878,147 B2 | 4/2005 | Prakash et al. |
| 6,984,994 B2 | 1/2006 | Gregg |
| 7,073,384 B1 | 7/2006 | Donskoy et al. |
| 7,079,029 B2 | 7/2006 | Tsuji |
| 7,079,030 B2 | 7/2006 | Tsuji |
| 7,119,737 B2 | 10/2006 | Tsuji |
| 7,159,774 B2 | 1/2007 | Woodard et al. |
| 7,176,829 B2 | 2/2007 | Tsuji |
| 7,206,719 B2 | 4/2007 | Lindsay et al. |
| 7,215,111 B2 | 5/2007 | Kaneyasu et al. |
| 7,215,252 B2 | 5/2007 | Schenck |
| 7,250,920 B1 | 7/2007 | Steinbrecher |
| 7,256,376 B2 | 8/2007 | Tsuji |
| 7,274,189 B2 | 9/2007 | Chen et al. |
| 7,280,078 B2 | 10/2007 | Salsman et al. |
| 7,318,824 B2 | 1/2008 | Prakash et al. |
| 7,423,934 B1 | 9/2008 | Uzes |
| 7,455,495 B2 | 11/2008 | Leogrande et al. |
| 7,483,800 B2 | 1/2009 | Geisheimer et al. |
| 7,492,165 B2 | 2/2009 | Maier et al. |
| 7,527,623 B2 | 5/2009 | Prakash et al. |
| 7,532,151 B2 | 5/2009 | Touge et al. |
| 7,541,995 B1 | 6/2009 | Murphy, Jr. |
| 7,554,324 B2 | 6/2009 | Gualtieri |
| 7,604,413 B2 | 10/2009 | Koike et al. |
| 7,737,880 B2 | 6/2010 | Vacanti |
| 7,777,610 B2 | 8/2010 | O'Toole et al. |
| 2008/0074674 A1* | 3/2008 | Chen et al. .............. 356/502 |
| 2008/0303513 A1 | 12/2008 | Turner |
| 2009/0102451 A1 | 4/2009 | Kwark |
| 2009/0243915 A1 | 10/2009 | Nishizato et al. |
| 2010/0125269 A1 | 5/2010 | Emmons et al. |
| 2010/0211334 A1 | 8/2010 | Sheikman et al. |

\* cited by examiner

SENSOR AND INSPECTION SYSTEM DEPLOYING AN OPTICAL CONDUIT

BACKGROUND OF THE INVENTION

The subject matter disclosed herein relates to inspection systems and, more particularly, to embodiments of inspection systems that use light to operate a sensor.

Machines may exhibit abnormal behavior (e.g., excess vibration) during operation. Inspection systems can measure this abnormal behavior to provide an alarm or other indication of the abnormal behavior. For example, these inspection systems may deploy one or more sensors proximate the machine to determine an amount of vibration, movement, or other operational characteristic of the machine. The sensors provide signals to other components of the inspection system, which can process the signals and, in one example, display graphical representations of the data.

Many inspection systems use an electrical cable (e.g., copper cable, coaxial cable, etc.) to couple the sensor to components that operate the sensor and/or receive and process signals from the sensor. Signals that the electrical cables transmit, however, are susceptible to noise, interference, and other outside influences that can degrade and distort the signals. Moreover, these problems become more pronounced as the length of the electrical cable increases.

The discussion above is merely provided for general background information and is not intended to be used as an aid in determining the scope of the claimed subject matter.

BRIEF DESCRIPTION OF THE INVENTION

A proximity inspection system is disclosed, wherein the proximity inspection system comprises a conduit that can transmit light signals between a sensor and a signal processing and control component. An advantage that may be realized in the practice of some disclosed embodiments of the inspection system is the reduction of distortion and other issues found in conventional electrical cables, thereby increasing the possible separation distance between the sensor and the diagnostic component.

This brief description of the invention is intended only to provide an overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
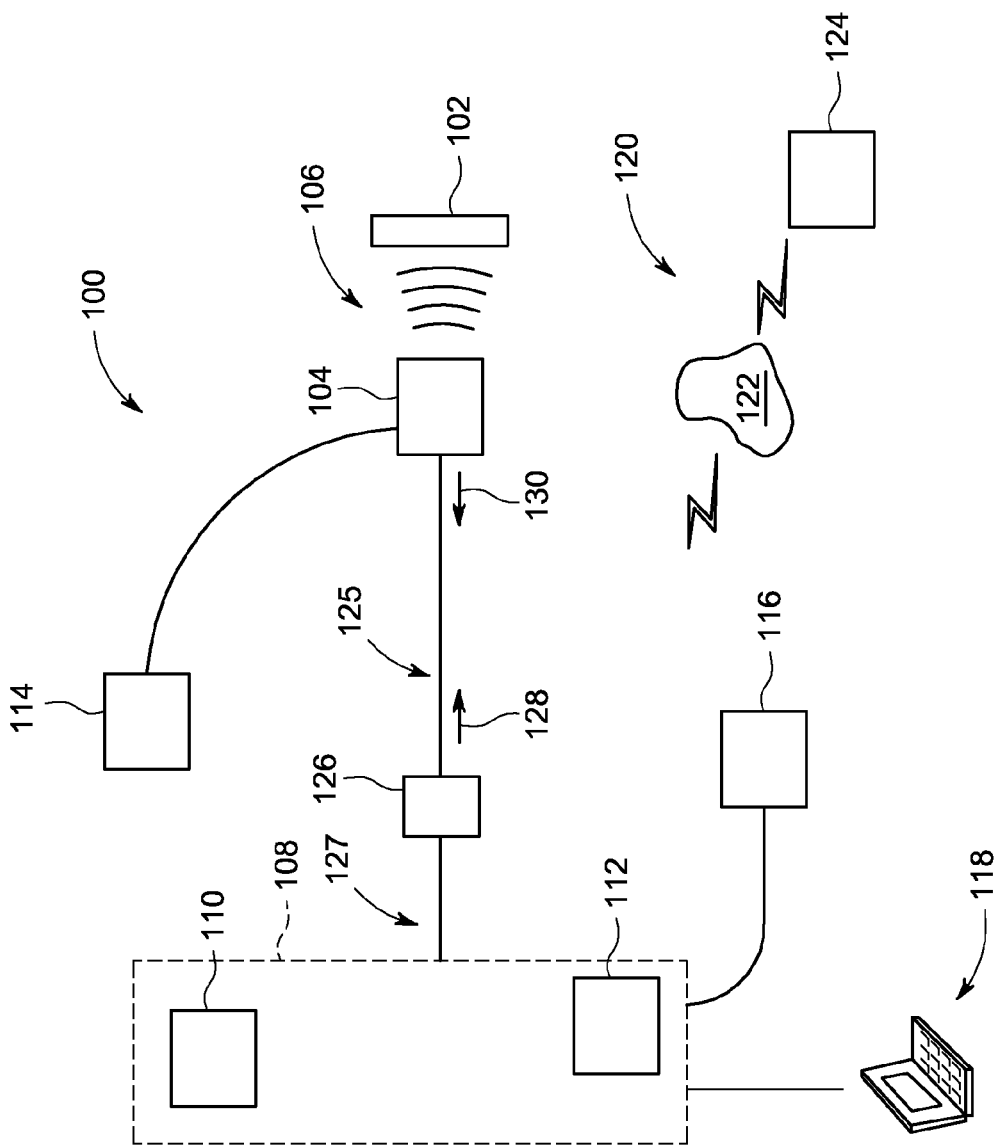
FIG. 1 is a schematic diagram of an exemplary embodiment of an inspection system.

FIG. 1 illustrates an exemplary embodiment of an inspection system 100 that can measure, monitor, and inspect an object 102. The inspection system 100 comprises a sensor 104 that can generate an electromagnetic field 106 and a diagnostic component 108 with a control component 110 and a processing component 112. The inspection system 100 also comprises a power supply 114, which supplies power (e.g., +5V DC) to the sensor 104, and one or more peripheral devices such as a display 116 and/or a computing device 118. The inspection system 100 can be part of a network system 120, which comprises a network 122 and one or more external servers 124.

The inspection system 100 also includes a first data conduit 125, which couples the sensor 104 to a signal processing and control component 126. In one example, the sensor 104 and the signal processing and control component 126 can be considered a sensor assembly. The inspection system 100 also includes a second data conduit 127 to couple the signal processing and control component 126 to the diagnostic component 108. The first data conduit 125 can transmit light and/or light signals to the sensor 104 and to the signal processing and control component 126. The light signals are identified in the present example as a driving light signal 128 and a receiving light signal 130.

Embodiments of the inspection system 100 convert electrical signals to light signals (e.g., the driving light signal 128 and the receiving light signal 130), and vice versa. The light signals facilitate communication between the sensor 104 and the signal processing and control component 126. Using light as the medium of communication allows for greater separation between the sensor 104 and the signal processing and control component 126. Light is less susceptible to, and generally unaffected by, noise and electrical interference. These problems can distort signals that travel over conventional electrical cables (e.g., copper cables). By effectively eliminating distortion, embodiments of the inspection system 100 permit separation of the sensor 104 from the signal processing and control component 126 of at least about 8230 mm (27 feet) and greater allowing for the length of the first data conduit 125 to be greater than the length of equivalent electrical cable. Moreover, the lack of distortion using light signals permits the use of higher frequency devices (e.g., the sensor 104), which provide more accurate and effective measurement and which are particularly useful for measuring in the near field region.

The sensor 104 can substitute for known eddy current sensors, magnetic pickup sensors, and capacitive sensors. Examples of the sensor 104 can measure the proximity and/or distance to the object 102. Other examples can find use in any number of applications. Some applications may entail static detection where, for example, the sensor 104 detects the proximity of the object 102 to measure expansion and/or contraction, e.g., of the object 102. Other applications may deploy the sensor 104 for dynamic detection in which the sensor 104 measures the proximity of the object 102 to detect movement, e.g., vibration of a rotating turbine shaft.

The first data conduit 125 can comprise fiber optic and/or optical fiber cable with one or more fiber elements that can transmit light. Embodiments of the inspection system 100 can deploy any number of optical fiber cables, e.g., an optical fiber cable for the driving light signal 128 and, separately, an optical fiber cable for the receiving light signal 130. In one embodiment, the first data conduit 125 comprises a single optical fiber cable that can transmit a plurality of different light signals between the sensor 104 and the sensor signal processing and control component 126. A power cable can run co-extensively with (or as part of) the optical fiber cable to transmit power from the power supply 114 to the sensor 104.

Examples of the diagnostic component 108 can be an independent component that receives signals which are representative of the operating state of equipment in an industrial setting. These signals can represent various operating conditions such as temperature, speed, vibration, position, etc., of equipment and assets in the industrial setting. The diagnostic component 108 can process these signals, generating in one example one or more output signals, which is transmitted to additional components such as a display, a supervisory control and data acquisition (SCADA) system, etc.

In one embodiment, the control component 110 generates an electrical signal at variable frequencies and states that can control the operation and function of various plant assets. For example, the control component 110 may vary the level of a DC voltage which is used to control a valve that regulates the amount of steam entering a turbine. Examples of the control component 110 include oscillators, relays, and voltage outputs. The processing component 112 processes electrical signals and, in one example, can compare two electrical signals to determine the difference there between. Results of the comparison are expressed as a processed signal and/or other electrical output.

The display 116 and the computing device 118 can display the processed signal as a graphical representation of the data and/or information encoded by the processed signal. Examples of the devices can include an oscilloscope or related test instrument. Other examples can also provide a graphical user interface (GUI) or other display by which an end user can interface with the diagnostic component 108, as well as other parts of the network system 120. In one embodiment, the end user can manipulate the processed signal such as by selecting and/or choosing different settings, e.g., sampling rate of the data, sampling time periods, variable frequency, variable voltage, etc.

The sensor signal processing and control component 126 can generate the driving light signal 128. The sensor 104 uses the driving light signal 128 to generate an electrical driving signal (not shown), which causes the electromagnetic field 106 to form. When object 102 interferes with the electromagnetic field 106, a distortion is induced in the electromagnetic field 106, which is sensed by the sensor 104. In one embodiment, the sensor 104 can generate the receiving light signal 130 of a different wavelength of light. The different wavelength differentiates the receiving light signal 130 from the driving light signal 128. The receiving light signal 130 is representative of the distortion, which is created by the impedance mismatch when object 102 interferes with the electromagnetic field 106.

Figure 2:
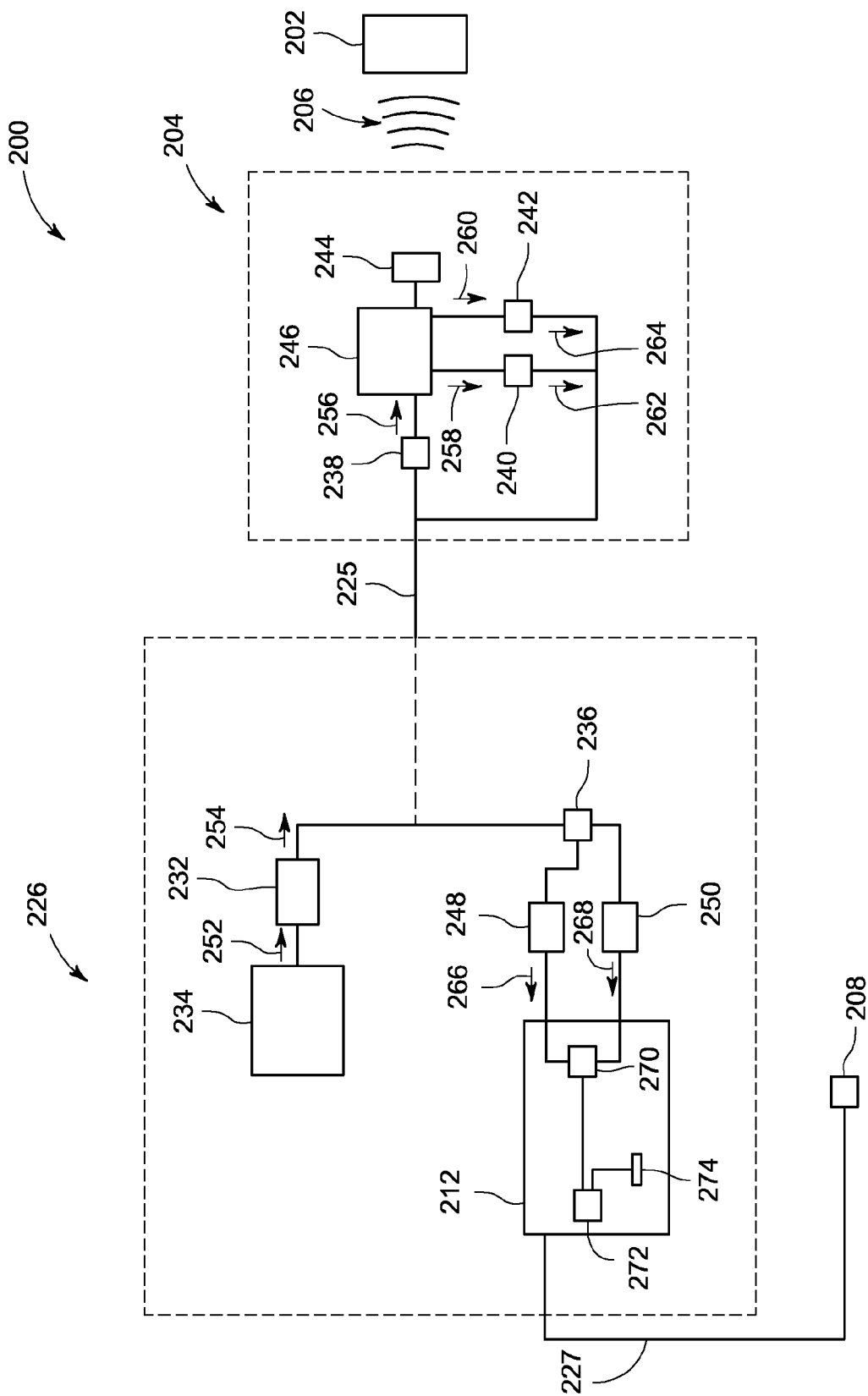
FIG. 2 is a schematic diagram of another exemplary embodiment of an inspection system.

FIG. 2 illustrates another embodiment of an inspection system 200 to monitor an object 202 with an electromagnetic field 206. The inspection system 200 includes a first data conduit 225 and a second data conduit 227. The inspection system 200 also includes a first light source 232, which is coupled to an electrical signal oscillator 234, an optical filter 236, a first photo-detector 238, a second light source 240, and a third light source 242. The inspection system 200 also includes an element 244 that generates the electromagnetic field 206. A directional coupler 246 couples the first photo-detector 238, the second light source 240, and the third light source 242 to the element 244. The inspection system 200 also includes a second photo-detector 248 and a third photo-detector 250.

Also shown in FIG. 2 are a variety of signals (or "inputs and outputs") that the inspection system 200 can generate. These signals include electrical signals and light signals. Details of the signals follow below in connection with a discussion of an exemplary operation of the inspection system 200.

In one embodiment, the electrical signal oscillator 234 generates an electrical driving signal 252, which the first light source 232 converts to an optical driving signal 254. This signal traverses the first data conduit 225 to the first photo-detector 238, which converts the optical driving signal 254 back to an electrical signal, shown as a restored driving signal 256. In one example, the directional coupler 246 directs a portion of the restored driving signal 256 as a forward reflected electrical signal 258. The forward reflected electrical signal 258 has properties (e.g., phase and frequency) consistent with and/or proportional to and/or based on the properties of the restored driving signal 256. In one example, the forward reflected electrical signal 258 has the same frequency and phase properties as the restored driving signal 256, but at a smaller amplitude.

The direction coupler 246 will also direct a portion of the restored driving signal 256 to the element 244, which electrically excites the element 244 and creates the electromagnetic field 206. In one example, capacitive and/or inductive coupling of the object 202 to the electromagnetic field 206 "detunes" or changes the resonant response of the element 244. These changes induce a loading in the element 244, which causes the restored driving signal 256 to reflect in the element 244 and out of the element 244 as a reverse reflected electrical signal 260.

The second light source 240 and the third light source 242 convert the forward reflected electrical signal 258 and the reverse reflected electrical signal 260 to light signals and, more particularly, to a forward reflected optical signal 262 and a reverse reflected optical signal 264. These light signals traverse the conduit 225. The forward reflected optical signal 262 and the reverse reflected optical signal 264 may traverse the same cable or, in another example, the conduit 225 may comprise separate cables for the forward reflected optical signal 262 and the reverse reflected optical signal 264. Likewise the optical driving signal 254, the forward reflected optical signal 262, and the reverse reflected optical signal 264 may traverse the same and/or separate cables, as desired.

Exemplary configurations of the optical filter circuit 236 can separate light of different wavelengths. This feature is useful, for example, to separate light from the second light source 240 (e.g., the forward reflected optical signal 262) and light from the third light source 242 (e.g., the reverse reflected optical signal 264) particularly when this light traverses a single optical fiber conduit. Prisms and similar optically arranged devices are illustrative of the optical filter 238.

The second photo-detector 248 and the third photo-detector 250 can convert the forward reflected optical signal 262 and the reverse reflected optical signal 264 to electrical signals such as a forward reflected processing signal 266 and a reverse reflected processing signal 268. Further processing of these electrical signals can occur, e.g., at a processing component 212, which can generate a difference signal (not shown). This signal defines the characteristics, properties, relationship, and other aspects of the object 202 that the inspection system 200 is to measure. In one example, the difference signal is representative of the proximity (mV/mm) of the object 202 relative to the sensor 204.

Embodiments of the inspection system 200 compare the forward reflected processing signal 266 to the reverse reflected processing signal 268, e.g., to determine changes in the position of the object 202 relative to the element 244. The difference signal can be displayed on a screen or other device (e.g., the display 116 and/or the computing device 118 of FIG. 1). Likewise the information stored in the difference signal can be stored on memory within a diagnostic component 208 or other locations (e.g., the computing device 118 and the external servers 124 of FIG. 1) or maintained for future use.

In one embodiment, one or more of the electrical signals are microwave signals. As used herein, the term "microwave" refers to signals with frequencies of about 300 MHz or greater and, in one example, from about 300 MHz to about 300 GHz. In one embodiment, the frequency of the electrical driving signal 252 is from about 3 MHz to about 6 GHz, although the frequency can vary in accordance with the construction of the sensor 204 as discussed and contemplated herein. Exemplary elements and materials for the construction of the element 244 are generally recognized by artisans having skill in the relevant sensor arts. In one example, the frequency of the restored driving signal 256 is the same, or substantially same, as the frequency of the electrical driving signal 252 that the electrical signal oscillator 234 generates.

The light sources (e.g., the first light source 232, the second light source 240, the third light source 242) can comprise light emitting diodes (LEDs) as well as other light-emitting, light-generating devices. The photo-detectors (e.g., the first photo-detector 238, the second photo-detector 248, the third photo-detector 250) can comprise photodiodes and/or other devices that can convert light into an electrical signal, e.g., a voltage or current. In context of the present example, and the present disclosure as a whole, the photodiodes can receive light signals from the LEDs and convert the light signals into electrical signals. In one embodiment, the inspection system 200 deploy LEDs with different wavelengths. Suitable wavelengths can vary from about 700 nm to about 1600 nm, and are generally greater than about 850 nm. In one example, the LED for the first light source 232 generates light at 800 nm, the LED for the second light source 240 generates light at 1000 nm, and the third light source 242 generates light at 1300 nm.

Referring still to FIG. 2, embodiments of the inspection systems 200 can also comprise a mixer 270, a processing filter 272, and a signal linearizer 274, which takes the final voltage output and makes it linear (rather than logarithmic or exponential). The diagnostic component 208 can receive the resulting "linearized" output, e.g., via the second data conduit 227.

Examples of the mixer 270 and the processing filter 272 facilitate signal processing functions such as functions that compare the reference signal and the detuned signal (discussed above and shown in FIG. 2). Artisans having skill in the relevant signal processing and sensor arts will recognize the various illustrative circuits, devices, and elements that the inspection system can use to provide such comparative functionality, as well as other functions that the present disclosure contemplates.

Although the present disclosure contemplates various configurations of the components shown in FIGS. 1 and 2, in one example, the sensor 204 can comprise the first photo-detector 238, the second light source 240, the third light source 242, the element 244, and the directional coupler 246. The signal processing and control component 226 can comprise the first light source 232, the electrical signal oscillator 234, the optical filter 236, the second photo-detector 248, and the third photo-detector 250. In still other embodiments, the signal processing and control component 226 may include other components, e.g., the processing component 212 and/or its components.

In addition to the components shown and described above, the inspection system of the present disclosure can comprise one or more processor(s), memory(s), and other auxiliary elements that facilitate the functions and operations disclosed herein. Processors can include one or more microcontrollers, microprocessors, reduced instruction set circuits (RISC), application specific integration circuits (ASIC), programmable logic circuits (PLC), and field programmable gate arrays (FPGA). The processors can also include state machine circuitry or other suitable components capable of receiving inputs and generating outputs. Memory can comprise volatile and non-volatile memory and can be used for storage of executable instructions (e.g., software and/or firmware) and configuration settings. In some embodiments, the processors, the memory, and other circuitry can be contained in a single integrated circuit (IC) or other component. As another example, the processors can include integral program memory such as RAM and/or ROM. Similarly, any one or more functions of these components can be distributed across additional components (e.g., multiple processors or other components).

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor assembly, comprising:
a sensor;
an optical data conduit coupled to the sensor; and
a sensor signal processing and control component coupled to the optical data conduit,
wherein the sensor and the sensor signal processing and control component are configured to exchange light signals via the optical data conduit,
wherein the sensor comprises a photo-detector that is configured to generate a first electrical driving signal, a directional coupler that is configured to direct the electrical driving signal to an element that is configured to generate an electromagnetic field in response to the electrical driving signal and to a light source,
wherein the light source is configured to generate a reverse reflected optical signal in response to reflection of the electrical driving signal in the element and a forward reflected signal with properties based on properties of the electrical driving signal, and wherein the sensor signal processing and control component comprises a photo-detector that is configured to convert the reverse reflected optical signal to a reverse reflected processing signal that identifies the proximity of an object to the sensor.

2. The sensor assembly of claim 1, wherein the properties include frequency, phase, and amplitude of the electrical driving signal.

3. The sensor assembly of claim 2, wherein the light source comprises a first light emitting diode that is configured to generate the forward reflected optical signal and a second light emitting diode that is configured to generate the reverse reflected optical signal.

4. The sensor assembly of claim 1, wherein the photo-detector comprises a photo-diode.

5. The sensor assembly of claim 1, further comprising an optical filter coupled to the optical data conduit, wherein the optical filter is configured to direct the reverse reflected optical signal and the forward reflected optical signal to a pair of photo-diodes.

6. An inspection system, comprising:
an optical data conduit;
a sensor signal processing and control component coupled to the optical data conduit;
a sensor coupled to the optical data conduit, the sensor comprising an element that is configured to generate an electromagnetic field in response to an optical driving signal from the sensor signal processing and control component; and
an electrical signal oscillator configured to generate an electrical driving signal at a frequency that can cause the electromagnetic field,
wherein the sensor generates a plurality of optical signals that traverse the optical data conduit, and
wherein the sensor signal processing and control component are configured to generate one or more processing signals from the optical signals that identify the proximity of an object to the sensor.

7. The inspection system of claim 6, wherein the frequency is 300 MHz or greater.

8. The inspection system of claim 6, wherein the optical signals include a reverse reflected optical signal representative of detuning of the element and a forward reflected optical signal with properties based on properties of the electrical driving signal.

9. The inspection system of claim 8, further comprising an optical filter that is configured to receive the optical signals, wherein the optical filter is configured to separate the reverse reflected optical signal from a forward reflected optical signal, wherein the forward reflected optical signal has an amplitude and phase based on the electrical driving signal.

10. The inspection system of claim 6, wherein the optical data conduit comprises an optical fiber cable, and wherein the optical fiber cable comprises a multimode cable that is configured to carry the optical signals between the sensor and the sensor signal processing and control component.

11. The inspection system of claim 6, further comprising a power source coupled to the sensor.

12. The inspection system of claim 6, wherein the first light source comprises a light emitting diode.

13. An inspection system, comprising:
a plurality of light sources;
an optical fiber cable coupled to the plurality of light sources;
a plurality of photo-detectors coupled to the optical fiber cable; and
an element configured to generate an electromagnetic field in response to light that traverses the optical fiber cable from the light sources to the photo-detectors,
wherein the light sources are configured to generate a forward reflected optical signal with properties based on an electrical driving signal and a reverse reflected optical signal in response to interference of an object with the electromagnetic field, and
wherein the photo-detectors are configured to convert the forward reflected optical signal and the reverse reflected optical signal to one or more processing signals that quantify the proximity of the object to the element.

14. The inspection system of claim 13, wherein the light sources comprise light-emitting diodes.

15. The inspection system of claim 13, wherein the photo-detectors comprise photo-diodes.

16. The inspection system of claim 13, further comprising an oscillator coupled to one of the light sources, wherein the oscillator is configured to generate the electrical driving signal that causes the electromagnetic field.

17. The inspection system of claim 16, wherein the electrical driving signal has frequency of about 300 Mhz or greater.

18. The inspection system of claim 13, further comprising a power source coupled to the sensor.

19. The inspection system of claim 13, further comprising an optical filter coupled to the optical fiber cable, wherein the optical filter is configured to direct light from a pair of the light sources to a pair of the photo-detectors.

20. The sensor assembly of claim 13, wherein the reverse reflected optical signal is representative of detuning of the element.

* * * * *

UNITED STATES PATENT AND TRADEMARK OFFICE
CERTIFICATE OF CORRECTION

Page 1 of 1

PATENT NO. : 8,742,319 B2
APPLICATION NO. : 13/324795
DATED : June 3, 2014
INVENTOR(S) : Sheikman et al.

It is certified that error appears in the above-identified patent and that said Letters Patent is hereby corrected as shown below:

Specification

In Column 4, Line 60, delete "238." and insert -- 236. --, therefor.

Claims

In Column 8, Line 48, in Claim 20, delete "sensor assembly" and insert -- inspection system --, therefor.

Signed and Sealed this
Second Day of February, 2016

Michelle K. Lee
*Director of the United States Patent and Trademark Office*